United States Patent
Nation et al.

(10) Patent No.: US 10,627,050 B1
(45) Date of Patent: Apr. 21, 2020

(54) CRYOGENIC HEATING SYSTEM

(71) Applicant: National Technology & Engineering Solutions of Sandia, LLC, Albuquerque, NM (US)

(72) Inventors: Brendan L. Nation, Albuquerque, NM (US); Tomas Farley Babuska, Albuquerque, NM (US); Rand Garfield, Corrales, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 356 days.

(21) Appl. No.: 15/659,477

(22) Filed: Jul. 25, 2017

Related U.S. Application Data

(60) Provisional application No. 62/367,986, filed on Jul. 28, 2016.

(51) Int. Cl.
| | | |
|---|---|---|
| *H05B 1/02* | (2006.01) | |
| *F17C 7/02* | (2006.01) | |
| *F17C 13/02* | (2006.01) | |
| *G05D 23/19* | (2006.01) | |
| *G05D 23/22* | (2006.01) | |
| *F16K 17/00* | (2006.01) | |

(52) U.S. Cl.
CPC ............ *F17C 7/02* (2013.01); *F16K 17/003* (2013.01); *F17C 13/026* (2013.01); *G05D 23/193* (2013.01); *G05D 23/22* (2013.01); *H05B 1/0247* (2013.01); *F17C 2223/0161* (2013.01)

(58) Field of Classification Search
CPC .. F17C 7/02; F17C 13/026; F17C 2223/0161; G05D 23/193; G05D 23/22; H05B 1/0247
See application file for complete search history.

(56) References Cited

U.S. PATENT DOCUMENTS

| | | | | |
|---|---|---|---|---|
| 4,918,930 | A | * 4/1990 | Gaudet | F04B 37/08 417/901 |
| 5,465,573 | A | * 11/1995 | Abe | F01N 3/2026 219/205 |
| 5,647,228 | A | * 7/1997 | Sager | B01L 7/00 62/49.2 |
| 6,578,367 | B1 | 6/2003 | Schaefer et al. | |
| 8,418,480 | B2 | 4/2013 | Danley et al. | |

OTHER PUBLICATIONS

Babuska TF et al., "Temperature-dependent friction and wear behavior of PTFE and MoS$_2$," Tribol. Lett. 2016;63:15 (7 pp.).

Babuska T et al., "Temperature-dependent wear and friction of MoS$_2$ (and PTFE!) at the extremes," Sandia Report No. SAND2016-5961C, Jun. 2016 (20 pp.).

(Continued)

*Primary Examiner* — Brian W Jennison
(74) *Attorney, Agent, or Firm* — Helen S. Baca

(57) ABSTRACT

The present invention relates to a cryogenic heating system including a plurality of stages to provide accurate temperature control. The system can be used to provide non-contact heating and cooling of a test sample by use of an inert fluid. Accurate temperature control can be maintained, e.g., by use of controllers to provide temperature feedback control.

20 Claims, 4 Drawing Sheets

(56) References Cited

OTHER PUBLICATIONS

Babuska T et al., "Low friction in metal contacts: linking microstructural evolution and tribology," Sandia Report No. SAND2017-5698C, May 2017 (19 pp.).
Curry JF et al., "Highly oriented $MoS_2$ coatings: tribology and environmental stability," *Tribol. Lett.* 2016;64:11 (9 pp.).
Curry JF et al., "Temperature-dependent friction and wear of $MoS_2/Sb_2O_3$/Au nanocomposites," *Tribol. Lett.* 2016;64:18 (5 pp.).
Jacobsen RT et al., "Thermodynamic properties of nitrogen including liquid and vapor phases from 63 K to 2000 K with pressures to 10,000 bar," *J. Phys. Chem. Ref. Data* 1973;2(4):757-922.
Nation BL et al., "In-situ testing: an exploration of increasing design complexity," Sandia Report No. SAND2015-10978C, Dec. 2015 (21 pp.).
Tatsumoto H et al., "Forced convection heat transfer of liquid hydrogen through a 200-mm long heated tube," *Physics Procedia* 2012;36:1360-5.

\* cited by examiner

US 10,627,050 B1

CRYOGENIC HEATING SYSTEM

CROSS-REFERENCE TO RELATED APPLICATION

This application claims the benefit of U.S. Provisional Application No. 62/367,986, filed Jul. 28, 2016, which is hereby incorporated by reference in its entirety.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to a cryogenic heating system including a plurality of stages to provide accurate temperature control. The system can be used to provide non-contact heating and cooling of a test sample by use of an inert fluid. Accurate temperature control can be maintained, e.g., by use of controllers to provide temperature feedback control.

BACKGROUND OF THE INVENTION

In situ heating and cooling of samples can be difficult to maintain and control. In particular, contact heating and cooling can be efficient but could degrade the test sample during analysis. There is a need for additional systems to heat and cool samples in a controlled manner while maintaining integrity of the sample to be tested.

SUMMARY OF THE INVENTION

Accordingly, the present invention relates to a system that employs an inert fluid (e.g., an inert gas, a cryogenic fluid capable of being converted into an inert gas, etc.) to provide non-contact heating and cooling of a test sample. The system can include the use of multiples stages of heaters to control the temperature of the inert fluid, as well as appropriate fluidic connections to deliver the inert fluid to the test sample. Such connections can be insulated to minimize heat loss or gain of the inert fluid. Accurate temperature control can be maintained by employing control boxes with feedback loops that connect to each heater in each stage. Additional details follow.

Definitions

As used herein, the term "about" means +/−10% of any recited value. As used herein, this term modifies any recited value, range of values, or endpoints of one or more ranges.

By "fluidic communication," as used herein, refers to any duct, channel, tube, pipe, chamber, or pathway through which a substance, such as a liquid, gas, or solid may pass substantially unrestricted when the pathway is open. When the pathway is closed, the substance is substantially restricted from passing through. Typically, limited diffusion of a substance through the material of a stage, plate, base, and/or a substrate, which may or may not occur depending on the compositions of the substance and materials, does not constitute fluidic communication.

As used herein, the terms "top," "bottom," "upper," "lower," "above," and "below" are used to provide a relative relationship between structures. The use of these terms does not indicate or require that a particular structure must be located at a particular location in the apparatus.

Other features and advantages of the invention will be apparent from the following description and the claims.

DETAILED DESCRIPTION OF THE INVENTION

Figure 1:
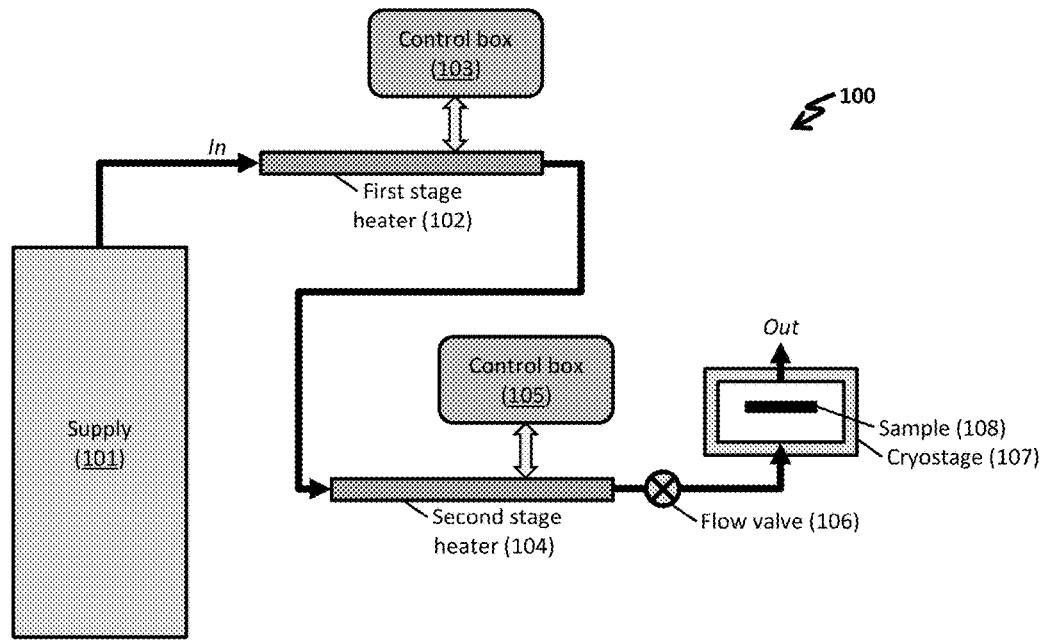
FIG. 1 provides an exemplary cryogenic heating system 100 including a first stage heater 102 and a second stage heater 104.

The present invention relates to a cryogenic heating system including a plurality of stages to provide accurate temperature control. The system can be used to provide non-contact heating and cooling of a test sample by use of an inert fluid. FIG. 1 provides an exemplary system 100 having a supply 101 including an inert fluid, which can be provided in any useful form (e.g., as a cryogenic liquid in a liquid dewar or a gas in a cylinder). Any useful fluid can be employed, which can include a liquid or a gas that is inert or relatively inactive (e.g., nitrogen, helium, argon, neon, as well as combinations thereof and in any useful phase or form). In some instances, the fluid is maintained at cryogenic temperatures to provide a liquid, such as a cryogenic liquid nitrogen. The supply can include any useful outlet (e.g., a valve) to deliver the inert fluid (e.g., as a gas or a liquid) to the remaining portion of the system (e.g., by way of any useful fluidic connection, such as tubing, lines, manifolds, etc.).

The system 100 can include any useful ducts, pipes, lines, manifolds, or channels to provide fluidic communication between the supply 101, the first stage heater 102, and/or the second stage heater 104. Such ducts, pipes, lines, or channels can be formed from any useful material (e.g., a flexible hose, a stainless steel duct with swage lock fittings, a flexible stainless steel tube, a PTFE feedthrough, etc.). In some embodiments, the first stage heater 102 and the second stage heater 104 can be optimized to operate at different temperatures. For instance, for gradual heating of the inert fluid, the first stage heater can be a low power heater configured to heat the fluid to a first temperature, and the second stage heater can be a high power heater configured to heat the fluid to a second temperature that is greater than the first temperature. The first and second stage heaters can be optimized to promote different phase changes. For instance, the first stage heater can be a heater optimized to heat the fluid to a first temperature that induces phase change of the fluid from a liquid to a gas, and the second stage heater can be a heater optimized to heat the fluid (e.g., a phase-changed gas) to a second temperature that is greater than the first temperature.

Precise temperature control can be maintained by way of control boxes that are electrically connected to the heaters. As seen in FIG. 1, the system 101 can include a first control box 103 electrically connected to the first stage heater 102, as well as a second control box 105 electrically connected to the second stage heater 104. Each controller can be independently controlled and monitored, with an optional input provided by a temperature sensor disposed in proximity to the sample 108 and/or the cryostage 107.

The first and second stage heaters can then provide a heated or cooled gas (e.g., of from about −200° C. to about 200° C.) to the sample. As seen in FIG. 1, the system 101 includes a cryostage 107 configured to maintain a sample 108 within the inner cavity, and the inner cavity is in fluidic communication with the output of the second stage heater 104. An optional valve 106 may be placed within the system to control pressure build-up, flow rate, and/or flow velocity.

The system can include any useful number of stages. In one instance, the system includes two stages of heaters in which each stage can include one or more heaters. In another instance, the system includes a plurality of stages (e.g., two, three, four, five, etc. stages), and each stage can include one, two, three, four, or more heaters. Each heater in each stage can be the same or different. Furthermore, each heater in each stage can be connected in any useful manner (e.g., in series or in parallel), and each stage can be connected in any useful manner (e.g., in series or in parallel). Each stage can provide a fluid of any useful temperature. In one instance, the first stage can provide an initially heated or cooled inert fluid at a first temperature, and the second stage can provide a further heated or cooled inert fluid at a second temperature that is different than the first temperature (e.g., in which the second temperature is greater than or less than the first temperature).

Figure 2:
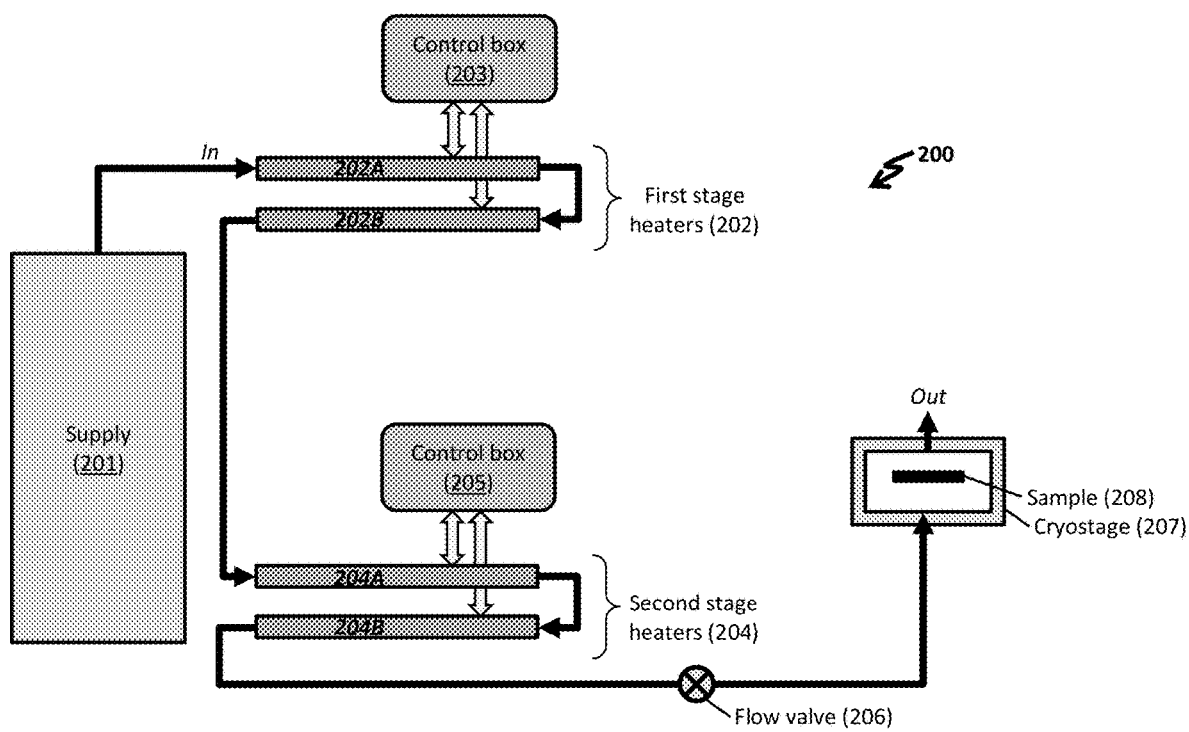
FIG. 2 provides another exemplary cryogenic heating system 200 including a first plurality of heaters 202A,202B as first stage heaters 202 and a second plurality of heaters 204A,204B as second stage heaters 204.

FIG. 2 shows another exemplary system 200 including a supply 201 in fluidic communication with a first stage connected in series to a second stage, which in turn is in fluidic communication with a sample 208 within an inner cavity of a cryostage 207. Each of the heaters in each stage is connected in series, and the first stage is connected in series to the second stage. The first stage includes first stage heaters 202 including two heaters 202A,202B and a control box 203 having an electric connection to each of the two heaters 202A,202B. The second stage includes second stage heaters 204 including two heaters 204A,204B and a control box 205 having an electric connection to each of the two heaters 204A,204B. The system 200 can optionally include a flow valve 206 (e.g., a needle valve or a mass flow controller).

Figure 3:
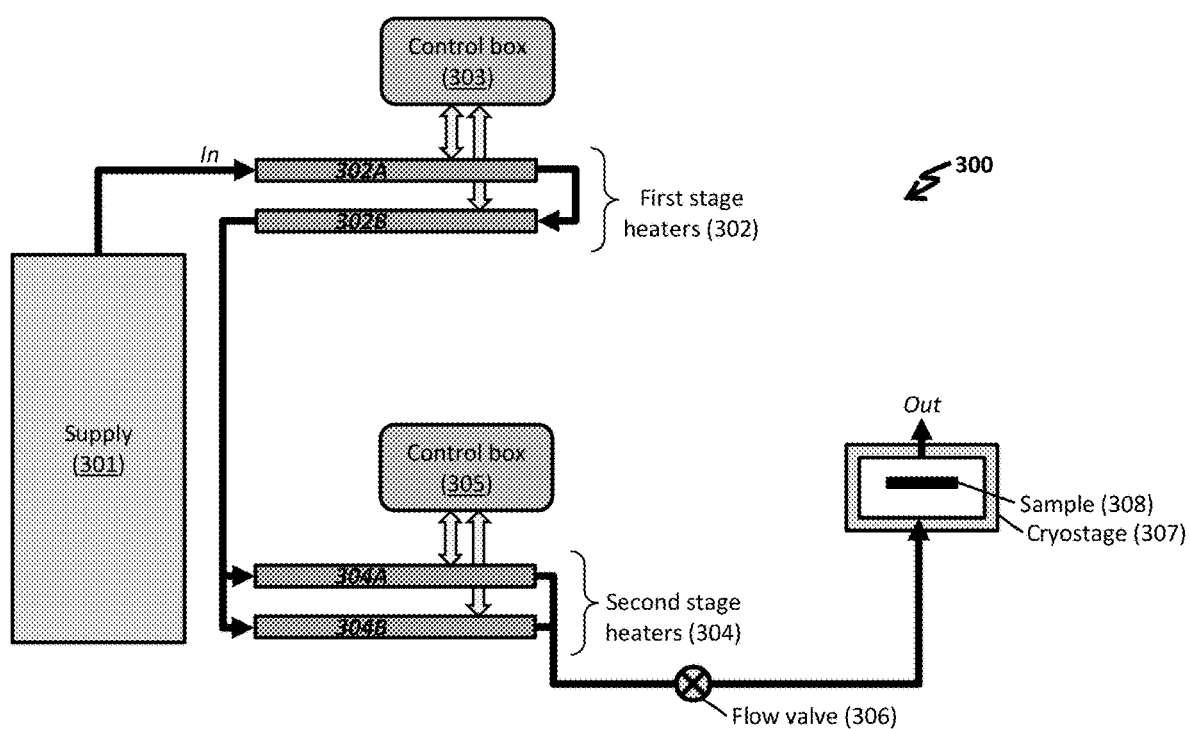
FIG. 3 provides yet another exemplary cryogenic heating system 300 including a first plurality of heaters 302A,302B connected in series as first stage heaters 302 and a second plurality of heaters 304A,304B connected in parallel as second stage heaters 304.

FIG. 3 shows yet another exemplary system 300 including a supply 301 in fluidic communication with a first stage connected in series to a second stage, which in turn is in fluidic communication with a sample 308 within an inner cavity of a cryostage 307. The heaters in the first stage are connected in series, but those in the second stage are connected in parallel. Furthermore, the first stage is connected in series to the second stage. The first stage includes first stage heaters 302 including two serial heaters 302A, 302B and a control box 303 having an electric connection to each of the two heaters 302A,302B. The second stage includes second stage heaters 304 including two parallel heaters 304A,304B and a control box 305 having an electric connection to each of the two heaters 304A,304B. The system 300 can optionally include a flow valve 306 or any other useful component (e.g., flow meter, filter, temperature sensor, pressure sensor, etc.).

Figure 4A:
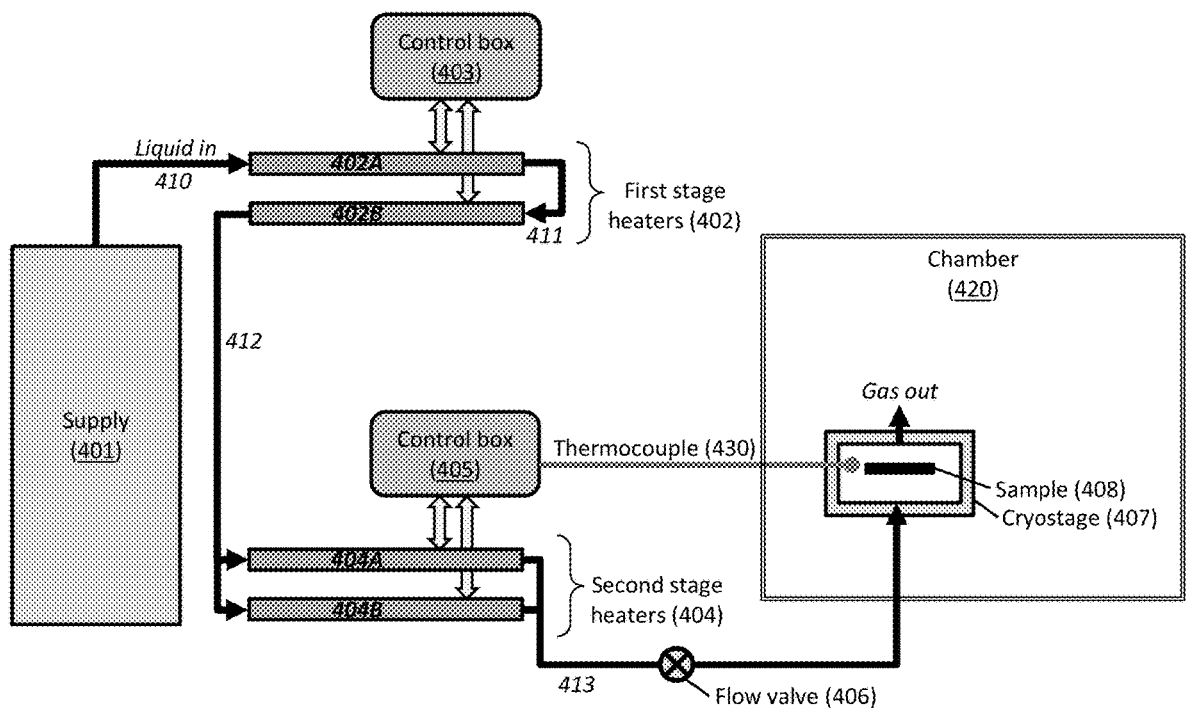
FIG. 4A-4B shows an exemplary system including a cryostage 407 provided within a chamber 420 (FIG. 4A) and a cross-sectional schematic of the cryostage including a lid 442 and a base 443 configured to maintain the sample 408 (FIG. 4B).

The system can be employed with any useful sample holder. FIG. 4A provides an exemplary system in which the sample 408 is contained within the cryostage 407, which in turn is maintained within an environmentally controlled chamber 420. The system also includes a temperature sensor (e.g., a thermocouple 430) that is electrically connected to the second control box 405, in which the electric signal from the sensor can be further used as an input to the first control box 403. The system includes a supply 401 in fluidic communication 410 with first stage heaters 402 (a first heater 402A in fluidic communication 411 with a second heater 402B in a serial manner, in which each heater is connected to the first control box 403), in which the output is in fluidic communication 412 with the second stage heaters 404 (a first heater 404A and a second heater 404B, in which each heater is connected to the second control box 405) in a parallel manner. The output of the second stage then is in fluidic communication 413 (having an optional flow valve 406) with the inner cavity of the cryostage 407, thereby delivering non-contact heating or cooling of the sample 408.

Figure 4B:
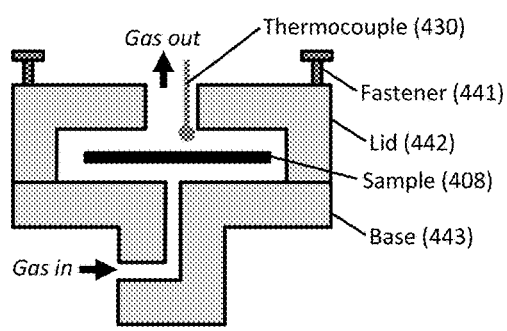

FIG. 4B provides an exemplary cryostage including a base 443 configured to receive the temperature-controlled gas and a lid 442 to maintain the sample 408. Any useful fastener 441 can be employed to attach the lid to the base. Other structures, e.g., washers, prongs, clamps, stages, etc., can be used to position the sample within the cavity formed by the base 443 and lid 442. An optional thermocouple 430 can be positioned at an outlet (e.g., within the lid) to provide accurate temperature measurements (e.g., for feedback control).

Figure 5A:
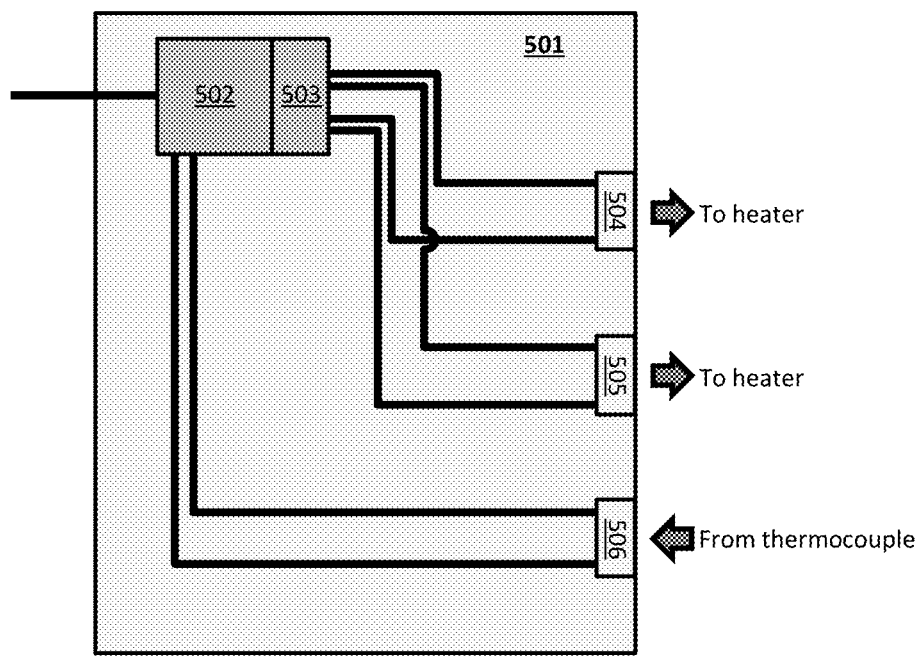
FIG. 5A-5B shows exemplary control boxes for use within the system. Provided are an exemplary first control box 501 having a feedback controller 502 (e.g., a PID controller) and a current controller 503 (FIG. 5A); and an exemplary second control box 511 having a feedback controller 512 (e.g., a PID controller) and a relay 513 (FIG. 5B).

Control boxes can include any useful components to provide temperature control. FIG. 5A provides an exemplary control box 501 including a PID controller 502 connected to an input 506 (e.g., from a temperature sensor, such as a thermocouple) and a variac current controller 503 connected to an output from a heater. The control box can include a plurality of outputs 504,505, in which each output is connected to each heater within a particular stage. In one non-limiting embodiment, the control box is employed for a first stage having one or more low power heaters.

Figure 5B:
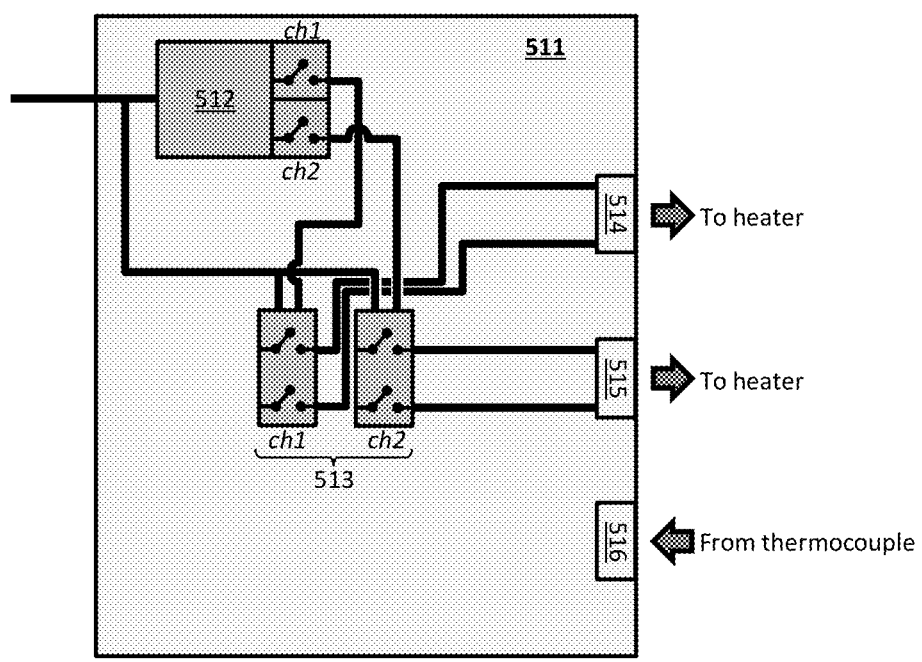

FIG. 5B provides another exemplary control box 511 including a PID controller 512 having two channels (ch1 and ch2), in which each channel is connected to a separate channel (ch1 and ch2) of a solid state relay 513. Each channel of the relay is electrically connected to each heater within a particular stage, in which the first channel ch1 is electrically connected 514 to a first heater and a second channel ch2 is electrically connected 515 to a second heater. Optionally, an input 516 can be connected (e.g., directly or indirectly connected) to a temperature sensor (e.g., a thermocouple), which in turn can be optionally connected to the PID controller 512. In one non-limiting embodiment, the control box 511 is employed for a second stage having one or more high power heaters. Switching at high currents can be facilitated by the PID control algorithm with enhanced accuracy (e.g., 0.1% accuracy).

EXAMPLE

The cryogenic heating stage uses a liquid nitrogen supply to control the temperature of a test sample. The sample is indirectly heated or cooled by the gas from the T-type tube heaters, which heat or cool the liquid nitrogen between a large temperature range (e.g., a range of about 400° C.). The heaters are controlled by a custom built control system able to obtain precise and accurate temperatures.

The in situ cryogenic temperature-controlled rapid aging heater employs a cryogenic inert gas supply to heat and cool a sample (e.g., a test coupon) between of from about −200° C. to about 200° C. The inert gas supply can be any useful gas (e.g., liquid nitrogen or helium) at any useful temperature (e.g., cryogenic temperatures or room temperature). Further, temperature control is maintained without direct contact with the sample because a stream of heated gas or cooled gas is directed onto a surface of the sample. The cryostage uses tube gas heaters (e.g., totaling about 1900 watts), which are controlled by a series of control boxes implementing advanced temperature process proportional-integral-derivative (PID) controllers. Such controllers provide accurate temperature control (e.g., of from about +/−0.5°).

Any useful combination of heaters can be employed. In one instance, a two-stage heating system is used. The first stage includes a set of low power heaters (e.g., two 150 W tube heaters) connected to the inert gas supply. Upon heating of the gas by the first stage, the heated gas then proceeds to the second stage, which includes a set of high power heaters (e.g., two 750 W tube heaters). Each heater in each stage can be connected in any useful manner (e.g., in parallel or in series) to effectively provided heated gas of a desired temperature. Each heater, in turn, can be connected to a control box for accurate temperature control. Exemplary systems providing various heater connections are provided in FIGS. 1, 2, 3, and 4A-4B.

Control boxes can include any useful electronic components for controlling temperature, such as a PID controller, solid state relays, resistors, fuses, variac current controllers, etc. Exemplary control boxes are provided in FIG. 5A-5B.

Other useful components can be employed. For instance, emergency temperature shutoff systems can be useful to avoid that hazardous build-up of pressure. In another instance, thermocouples can also be employed to measure the actual temperature at the location of the sample. In yet another instance, flow valves can be employed to control the flow rate of the gas through the system.

The temperature range can be expanded by the inert gas supply source. For instance, cryogenic gas can be employed to cool and heat the sample from room temperature (e.g., from a range of from about −200° C. to about 200° C.). In another instance, an inert gas supply at room temperature can be employed to provide heating up to 540° C.

Any useful sample holder can be employed with the cryostage. In one embodiment, the system connects to a sample holder (e.g., a modular sample holder made of any useful material) that is mounted on a friction testing system inside of a controlled atmospheric chamber. Heated or cooled inert gas can be delivered to the stage in order to control the testing temperature of the sample.

Other Embodiments

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. A cryogenic heating system comprising:
   a supply comprising an inert fluid, wherein the supply comprises an outlet to deliver the inert fluid;
   a first stage comprising a plurality of low power heaters in fluidic communication in a serial manner, wherein the first stage is in fluidic communication with the outlet of the supply and wherein the first stage is configured to provide an initially heated inert fluid at a first temperature;
   a first control box electrically connected to each of the heaters in the first stage, wherein the first control box comprises a first proportional-integral-derivative controller connected to an input and a variac current controller connected to an output to each of the heaters in the first stage;
   a second stage comprising a plurality of high power heaters in fluidic communication in a parallel manner, wherein the first stage is connected in series to the second stage and the second stage is in fluidic communication with at least one heater of the first stage, and wherein the second stage is configured to provide a further heated inert fluid at a second temperature that is different than the first temperature;
   a second control box electrically connected to each of the heaters in the second stage, wherein the second control box comprises an input and a second proportional-integral-derivative controller comprising a plurality of channels, wherein each channel is connected to a separate channel of a solid state relay, and wherein each separate channel of the solid state relay is electrically connected to each of the heaters in the second stage;
   a cryostage comprising an inner cavity configured to maintain a sample, wherein the cryostage is in fluidic communication with the second stage, thereby allowing the further heated inert fluid to heat or cool the sample within the inner cavity; and
   a thermocouple configured to measure a temperature within the inner cavity of the cryostage, wherein the inputs for the first controller and the second controller are provided by the thermocouple.

2. The system of claim 1, wherein the inert fluid is an inert gas or an inert liquid.

3. The system of claim 1, wherein the supply provides the inert fluid in a liquid phase and wherein the first stage provides the initially heated inert fluid in a gas phase.

4. The system of claim 1, wherein the first temperature and the second temperature is of from about −200° C. to about 600° C.

5. The system of claim 1, wherein the first temperature provides a phase change to the inert fluid from a liquid to a gas, thereby providing a phase-changed gas.

6. The system of claim 5, wherein the second temperature provides a heated phase-changed gas having a temperature greater than the first temperature.

7. The system of claim 1, wherein the plurality of low power heaters comprises a plurality of low power tube heaters.

8. The system of claim 7, wherein the plurality of high power heaters comprises a plurality of high power tube heaters.

9. The system of claim 1, wherein the input of the second control box is connected to the second proportional-integral-derivative controller.

10. The system of claim 1, wherein the inert fluid comprises liquid nitrogen or helium.

11. The system of claim 1, wherein the first stage comprises a plurality of heaters characterized by of from about 20 W to about 250 W and wherein the second stage comprises a plurality of heaters characterized by of from about 500 W to about 1000 W.

12. The system of claim 1, wherein the cryostage is maintained within an environmentally controlled chamber.

13. A cryogenic heating system comprising:
- a supply comprising an inert fluid, wherein the supply comprises an outlet to deliver the inert fluid in a liquid phase;
- a first stage comprising a plurality of low power heaters in fluidic communication in a serial manner, wherein the first stage is in fluidic communication with the outlet of the supply and wherein the first stage is configured to provide an initially heated inert fluid at a first temperature in a gas phase;
- a first control box electrically connected to each of the heaters in the first stage, wherein the first control box comprises a first proportional-integral-derivative controller connected to an input and a variac current controller connected to an output to each of the heaters in the first stage;
- a second stage comprising a plurality of high power heaters in fluidic communication in a parallel manner, wherein the first stage is connected in series to the second stage and the second stage is in fluidic communication with at least one heater of the first stage, and wherein the second stage is configured to provide a further heated inert fluid at a second temperature that is different than the first temperature;
- a second control box electrically connected to each of the heaters in the second stage, wherein the second control box comprises an input and a second proportional-integral-derivative controller comprising a plurality of channels, wherein each channel is connected to a separate channel of a solid state relay, and wherein each separate channel of the solid state relay is electrically connected to each of the heaters in the second stage;
- a cryostage comprising an inner cavity configured to maintain a sample, wherein the cryostage is in fluidic communication with the second stage, thereby allowing the further heated inert fluid to heat or cool the sample within the inner cavity; and
- a thermocouple configured to measure a temperature within the inner cavity of the cryostage, wherein the inputs for the first controller and the second controller are provided by the thermocouple.

14. The system of claim 13, wherein the first temperature and the second temperature is of from about −200° C. to about 600° C.

15. The system of claim 13, wherein the plurality of low power heaters comprises a plurality of low power tube heaters.

16. The system of claim 15, wherein the plurality of high power heaters comprises a plurality of high power tube heaters.

17. The system of claim 13, wherein the input of the second control box is connected to the second proportional-integral-derivative controller.

18. The system of claim 13, wherein the first stage comprises a plurality of heaters characterized by of from about 20 W to about 250 W and wherein the second stage comprises a plurality of heaters characterized by of from about 500 W to about 1000 W.

19. The system of claim 13, wherein the inert fluid comprises liquid nitrogen or helium.

20. The system of claim 13, wherein the cryostage is maintained within an environmentally controlled chamber.

* * * * *